United States Patent [19]
Mont et al.

[11] 4,027,069
[45] May 31, 1977

[54] LAMINATED SAFETY GLASS PREPARED FROM BUFFERED ACETAL

[75] Inventors: George E. Mont, Springfield; James A. Snelgrove, Monson, both of Mass.

[73] Assignee: Monsanto Company, St. Louis, Mo.

[22] Filed: Aug. 13, 1975

[21] Appl. No.: 604,400

[52] U.S. Cl. .......................... 428/437; 260/29.6 H; 260/73 L; 428/524

[51] Int. Cl.² .................. B32B 17/10; B32B 27/42

[58] Field of Search .......................... 428/437, 524; 260/29.6 H, 29.6 B, 29.6 N, 29.6 MP, 29.6 MN, 73 L, 45.7 R, 45.7 P, 45.85 B, 45.85 T; 156/106

[56] References Cited

UNITED STATES PATENTS

| | | | |
|---|---|---|---|
| 2,396,556 | 3/1946 | Cox | 260/73 L |
| 2,456,462 | 12/1948 | Stamatoff | 260/73 L |
| 3,249,489 | 5/1966 | Lavin | 428/339 |
| 3,262,836 | 7/1966 | Lavin | 260/73 L |
| 3,271,235 | 9/1966 | Lavin | 260/73 L |
| 3,402,099 | 9/1968 | Christensen | 260/73 L |
| 3,434,915 | 3/1969 | Garrison | 260/73 L |
| 3,468,749 | 9/1969 | Mattimoe | 260/73 L |
| 3,652,379 | 3/1972 | White | 428/446 |
| 3,781,184 | 12/1973 | Domicone | 428/415 |
| 3,810,769 | 5/1974 | Blacker | 106/135 |

*Primary Examiner*—Ellis Robinson
*Attorney, Agent, or Firm*—W. J. Farrington; J. C. Logomasini; S. M. Tarter

[57] ABSTRACT

Disclosed herein is a laminated safety glass prepared from a buffered polyvinyl acetal sheet. The sheet contains a pH buffer having an aqueous solution pH in the range of from 3 to 7 which stabilizes the sheet against viscosity degradation.

16 Claims, 2 Drawing Figures

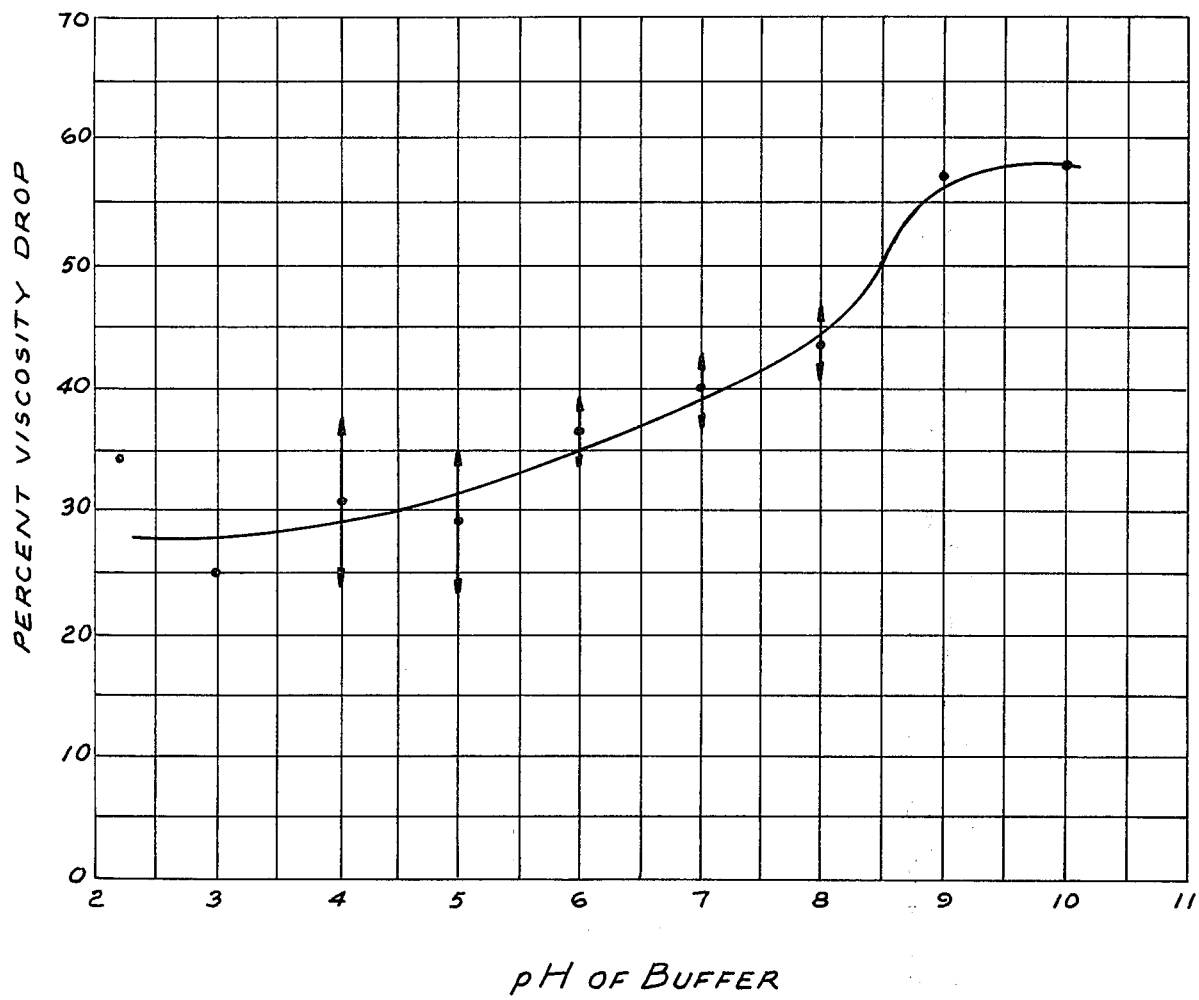
Fig. I.

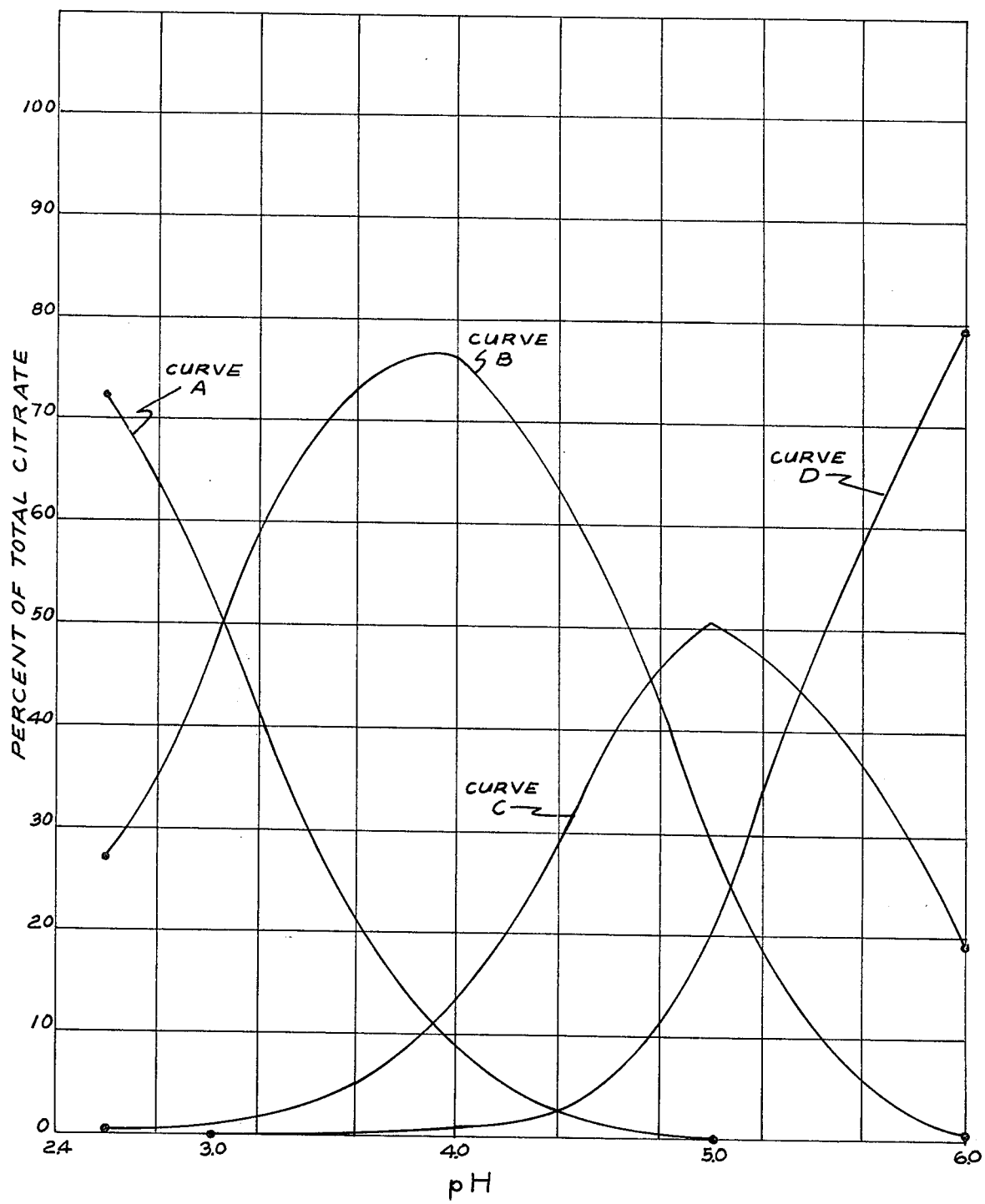
Fig. II.

LAMINATED SAFETY GLASS PREPARED FROM BUFFERED ACETAL

BACKGROUND OF THE INVENTION

1. Field of the Invention

The present invention relates to laminated safety glass of the type found in vehicles (e.g., windshields) and in architectural applications (e.g., windows and doors). More particularly, the present invention relates to laminated safety glass wherein a polyvinyl acetal sheet is laminated to at least one sheet of glass.

2. Description of the Prior Art

Laminated safety glass prepared by laminating a thermoplastic interlayer between two sheets of glass is well known in the prior art. Such laminates are widely used in automobile windshields and as windows and doors in architectural applications.

In recent years there has been a growing interest in laminated safety glass wherein only one sheet of glass is used, usually on the outboard side, that is, the side of the laminate that faces the outside of the vehicle or architectural structure. The inboard glass sheet, that is, the glass sheet that faces the interior of the vehicle or the architectural structure, is not used. The result is a glass/plastic laminate which is sometimes referred to as a bilayer or a bimodal laminate. The plastic component of the bilayer may be a single sheet or a composite of two or more components. These include a plastic component which is coated with another material, two or more plastic components laminated together, and various combinations of the above. Examples of such bilayer or bimodal construction are taught in U.S. Pat. Nos. 3,625,792, 3,652,379, 3,762,981, 3,781,184, 3,806,387 and Belgium Pat. No. 803,902.

Bilayer or bimodal laminated safety glass constructions have received widespread interest because of the theory that a person who collided with the laminate from the inboard side would tend to suffer less serious injuries by hitting a plastic component rather than a glass component. However, the dropping of the inboard glass sheet in laminated safety glass has given rise to new problems. The thermoplastic interlayer, which is no longer encased by the protective glass components, is now more susceptible to degradation which may adversely affect the properties of the laminate. Moreover, plastic sheets which are plasticized in order to obtain optimum physical properties may suffer from loss of plasticizer and a deterioration of properties. It has been proposed in the prior art to cover the plastic sheet with a protective coating or a protective layer. Many of the suggested coverings or coatings do not provide the desired level of protection to the plastic sheet.

Thus, a need exists in the art for a bilayer laminated safety glass wherein the plastic sheet, which is in laminated contact with the glass sheet, is stabilized against resin degradation.

SUMMARY OF THE INVENTION

The needs in the prior art are fulfilled by the present invention which provides an improved laminated safety glass which comprises glass sheet laminated to a buffered polyvinyl acetal sheet. More particularly, the present invention provides laminated safety glass wherein the polyvinyl acetal component of the laminate has been buffered in order to minimize the decrease in resin viscosity which occurs upon aging or when the resin is exposed to elevated temperatures. Polyvinyl acetal interlayers which are buffered in accordance with the teachings of the present invention exhibit a smaller decrease in resin viscosity during the thermal processing and aging of these materials as compared to similar resins which do not contain a buffer.

DESCRIPTION OF THE DRAWINGS

FIG. I is a graph of percentage viscosity drop versus the pH of the buffer as determined by the plastic oxidation test which is described below. The resin and buffer systems used are those set forth in Examples 1 to 20. The arrows on the graph show the range in the experimental data at a given pH when using various buffers.

FIG. II is a plot showing various components present in a citrate buffering system at various pH levels. The species present include citric acid, monosodium citrate, disodium citrate and trisodium citrate. Curve A represents the amount of citric species; Curve B represents the amount of monosodium citrate species; Curve C represents the amount of the disodium citrate species; and Curve D represents the amount of the trisodium citrate species.

DESCRIPTION OF THE PREFERRED EMBODIMENTS

The Polyvinyl Acetal Resins

The polyvinyl acetal resins which are employed in the present invention are well known in the art. These resins and processes for their preparation are described at length in Morrison et al. U.S. Pat. No. Re 20,430, dated June 29, 1937, and Lavin et al. U.S. Pat. No. 2,496,480. In general, polyvinyl acetal resins made from saturated lower unsubstituted aliphatic aldehydes are the most suitable with polyvinyl acetal resins made from butyraldehyde being preferred for safety glass interlayers.

In general, the polyvinyl acetal resins employed have Staudinger molecular weights ranging from about 50,000 to 600,000 and preferably from 150,000 to 270,000 and may be considered to be made up, on a weight basis, of from 5 to 30 percent hydroxyl groups, calculated as polyvinyl alcohol; 0 to 40 percent ester groups, preferably acetate groups, and the balance substantially acetal. When the acetal is butyraldehyde acetal, the polyvinyl acetal resin will preferably contain, on a weight basis, from 12 to 25 percent hydroxyl groups, calculated as polyvinyl alcohol and from 0 to 3 percent by weight of ester, e.g., acetate groups, calculated as polyvinyl ester, the balance being substantially butyraldehyde acetal.

The polyvinyl acetal resin may be plasticized to the extent of about 20 to 80 parts plasticizer per hundred parts resin and more commonly between 20 and 50 parts for normal windshield use. This latter concentration is generally used with polyvinyl butyrals containing 12 to 23 percent vinyl alcohol by weight. In general, the plasticizers which are commonly employed are esters of a polybasic acid or a polyhydric alcohol. Particularly suitable are triethylene glycol di(2-ethyl butyrate), dibutyl sebacate, and dihexyl adipate and combinations of dihexyl adipate and phosphate plasticizer.

THE pH BUFFER SYSTEMS

The pH buffers used in the present invention are systems which resist changes in pH when acids or bases are added to the system. The buffers used are complex systems which comprise at least two components. At least one of the components of the buffer is at least a bidentate ligand with the ability to interact with a metal to form a chelated ring structure. In addition, the buffer should be substantially free of hydrochloric, nitric and sulfuric acids which may cause resin degradation. The preferred bidentate ligands are those which form 5 to 6 member ring structures, which structures usually have greater stability.

A further description of pH buffers, which are well known to those skilled in the art, may be found in Bates, R. G., ELECTROMETRIC pH DETERMINATIONS, John Wiley & Sons, Inc., New York (1954) and in Lange's Handbook of Chemistry, 9th Edition, pages 951–952 as well as in other well known references. Bidentate ligands with the ability to interact with a metal to form a chelated ring structure are also well known to those skilled in the art. Such bidentates are described in Martell, A. E. & Calvin, M., CHEMISTRY OF THE METAL CHELATE COMPOUNDS, Prentice Hall, New York (1952) as well as in other well known references.

Examples of buffer components which are at least bidentate with the ability to interact with a metal to form a chelated ring structure include phosphates such as sodium acid phosphate, disodium phosphate, dipotassium phosphate, ethyl acid phosphate; and the corresponding pyrophosphates, tripolyphosphates and tetraphosphates; citrates such as sodium acid citrate, disodium citrate, dipotassium citrate, tripotassium citrate, disodium monopotassium citrate, ethyl acid citrate and dimethyl citrate; ortho phthalates such as sodium acid $\sigma$-phthalate, disodium $\sigma$-phthalate, potassium acid $\sigma$-phthalate, dipotassium $\sigma$-phthalate and ethyl acid $\sigma$-phthalate; borates such as sodium acid borate, disodium borate, dipotassium borate, ethyl acid borate, and the corresponding meta- and tetra-borates, potassium tetroxalate, potassium hydrogen tartrate, potassium acid succinate, potassium succinate, potassium acid phenyl succinate, potassium salicylate, potassium sulfosalicylate, potassium acid 1,2-cyclohexane dicarboxylate, potassium acid 2,3-naphthalene dicarboxylate, dipotassium diacid 1,4,5,8-naphthalene tetracarboxylate, monoesters of phosphoric acid, partially neutralized amine salts, etc.

Examples of the preferred buffer systems used in the present invention include the alkali metal and alkaline earth metal phosphates, citrates, phthalates, borates and citrate/phosphate combinations used below in the working examples.

The buffer systems are usually complex systems comprising more than one species of chemical compound at any given pH. The nature of the species present will vary with the pH as is illustrated in FIG. II where at a pH of 4, four different species are present. These species and the amount of each is set forth below.

| Species | % by Weight |
|---|---|
| citric acid | 8.5 |
| monosodium citrate | 77.0 |
| disodium citrate | 14.0 |
| trisodium citrate | 0.5 |
|  | 100.0 |

The buffers used in the present invention have a pH in the range of from 3 to 7. Lower pH values should be avoided in order to avoid resin degradation. At pH values above 7 the viscosity stabilization becomes less pronounced. The amount of buffer used is at least 20 parts (dry basis) per million parts (ppm) of polyvinyl acetal resin. The upper limit, which should not exceed 20,000 ppm is determined by the particular buffer, the polyvinyl acetal resin and the amount of stability required. When using larger amounts of buffer there is a danger of losing the desired physical or optical properties in the interlayer and a laminated safety glass made from this interlayer. Preferably, 50 to 1300 parts per million (ppm) of buffer are used and more preferably from 50 to 800 ppm are used.

The particular buffer selected from any given application should be compatible with the polyvinyl acetal resin used and not cause any adverse effects on the physical and optical properties of laminated safety glass prepared from the polyvinyl acetal resin.

The buffers may be added to the polyvinyl acetal resin during any of the normal resin processing operations such as washing, drying, etc. The buffers may also be added to the plasticizer used for the resin and thereby incorporated into the resin during the plasticization step. This method is especially effective if the buffer is soluble in the plasticizer. The buffer may also be added to the resin during a shaping or forming operation, such as during extrusion of the resin into a sheet. Preferably, the buffers are incorporated into the resin prior to the resin being fabricated into a shaped article.

In the preferred method, the buffer is prepared in aqueous solution so as to obtain a pH in the range of from 3 to 7. The buffer solution is then incorporated into the polyvinyl acetal resin.

During extrusion or seasoning, thermally unstable resins will undergo a significant decrease in resin viscosity and will exhibit an increase in yellow color indicating that the resin is being degraded. Resins buffered according to the teachings of the present invention retain a major amount of their original viscosity and, in many instances, do not exhibit as much increase in yellow color as do the unbuffered resins. The test methods used to measure viscosity retention and yellow color are described below.

TEST METHODS

Plastic Oxidation Test

One hundred parts of resin, a plasticizer for the resin and the buffers being evaluated are blended in a flask to form a homogeneous system. The plasticized resin sample is then placed in a 130° C. air circulating oven for 45 minutes. A control sample is held at room temperature. The viscosities of the control sample and the heated sample are measured in a methanol solution containing 7½ resin solids. The viscosity measurements are carried out at 20° C. using an Ostwald-Fenske Viscometer and the results reported in centipoises. The percent of viscosity retention on the heated sample is then calculated to give a measure of the thermal oxidative stability of the buffered resin. The viscosity change is calculated as follows:

$$\frac{\text{original viscosity} - \text{viscosity after treating}}{\text{original viscosity}} \times 100\% = \% \text{ change}$$

It should be noted that the plastic oxidation test (POT) is mainly for screening purposes. The test conditions make no attempt to exclude air. Consequently, viscosity changes and color development are more severe than comparable measurements made under actual extrusion conditions.

PERCENT YELLOW DETERMINATION

The percent yellow values are determined using a 7.5% resin solution in methanol and a Klett-Summerson Photoelectric Colorimeter. The absorption is measured at 420 millimicrons with a blue filter and at 660 millimicrons with a red filter and the readings converted to percent transmission. Subtraction of the 420 millimicron reading from the 660 millimicron reading gives the percent yellow. These values indicate the amount of yellow color in the resin.

BRABENDER COMPOUNDING

The desired amount of plasticizer is added to 40.0 g. of the polyvinyl acetal resin and the mixture is stirred manually to obtain a uniform blend. The plasticized resin is then placed in the mixing chamber of a Brabender Plastograph (Model No. 537) equipped with sigma blades. The Plastograph is made by Brabender Corp., Rochelle Park, New Jersey. The sample is then mixed for 7 minutes at 150° C. and 50 RPM (blade speed). The sample is then tested for viscosity reduction and percent yellow color.

The following examples are set forth in illustration of the present invention and should not be construed as a limitation thereof. All parts and percentages given are by weight unless otherwise indicated.

EXAMPLES 1 to 20

In these Examples various aqueous buffer solutions are prepared according to the teaching set forth in Lange's Handbook of Chemistry, 9th Edition, pages 951 to 953. The buffers used in Examples 2 to 12 are Clark and Lubs buffer mixtures while the citrate/phosphate buffers used in Examples 14 to 20 are MacIlvaine buffer mixtures. The buffer solutions are then added to a conventional polyvinyl butyral resin so as to provide 1000 parts of buffer (dry basis) per million parts of resin. The butyral resin has a polyvinyl alcohol content of 18–21%, a residual acetate content of less than 2.5% by weight with the balance of the resin being substantially butyral groups. The resin has a titer level of 106 cc. due to the presence of potassium acetate. The resin and buffer mixture is then mixed with 42 parts of triethylene glycol di(2-ethyl butyrate) plasticizer per hundred parts of resin (phr). The resin, buffer and plasticizer are thoroughly mixed and the resulting plasticized blend is then subjected to the plastic oxidation test. After the plastic oxidation test, viscosity measurements are made on the exposed samples. The results of these tests are tabulated in Table I below.

TABLE I

SUMMARY OF EXAMPLES 1 to 20

| Example | Buffer | pH | % Viscosity Decrease |
|---|---|---|---|
| 1 | Control None | — | 60.5 |
| 2 | phosphate | 6 | 26.9 |
| 3 | phosphate | 6 | 36.9 |
| 4 | phosphate | 7 | 36.9 |
| 5 | phosphate | 8 | 42.6 |
| 6 | phthalate | 4 | 30.4 |
| 7 | phthalate | 4 | 37.4 |
| 8 | phthalate | 5 | 35.2 |
| 9 | phthalate | 6 | 39.6 |
| 10 | borate | 8 | 45.6 |
| 11 | borate | 8 | 57.4 |
| 12 | borate | 9 | 58.7 |
| 13 | potassium acetate/ acetic acid | 4.8 | 69.5 |
| 14 | citrate/phosphate | 2.2 | 34.8 |
| 15 | citrate/phosphate | 3 | 24.4 |
| 16 | citrate/phosphate | 4 | 24.8 |
| 17 | citrate/phosphate | 5 | 24.4 |
| 18 | citrate/phosphate | 6 | 34.8 |
| 19 | citrate/phosphate | 7 | 43.9 |
| 20 | citrate/phosphate | 8 | 46.9 |

The data in Table I above (except for Example 13) show that polyvinyl butyral resin buffered in accordance with the teaching of the present invention exhibit less viscosity change than the control example which is not buffered. The examples further show that the preferred pH range of the buffer is from 3 to 7, as is further illustrated in FIG. I. Example 13 illustrates that an acetate buffer, which does not contain a component which is at least a bidentate, is not effective in minimizing the percent viscosity change of the polyvinyl butyral resin.

EXAMPLES 21 to 26

Examples 21 to 26 illustrate that in certain instances the buffer compounds of the present invention will also reduce the yellow color developed in polyvinyl butyral resin during thermal processing. The polyvinyl butyral resin used in these examples is plasticized with 41 parts per hundred parts of resin of a plasticizer mixture which is a 60/40 weight ratio of dihexyl adipate/octyl diphenyl phosphate. Examples 21 to 23 are control examples which do not contain any buffer. Examples 24 to 26 contain a Clark and Lubs phosphate buffer having a pH of 6. The samples are processed in a Brabender mixing device using the conditions set forth above. The samples are then tested for yellow color as described above. The test results on these samples are set forth in Table II below.

TABLE II

SUMMARY OF EXAMPLES 21 to 26

| Example | Buffer | Amount (1) | % Scrap (2) | % Yellow |
|---|---|---|---|---|
| 21 | Control | None | 0 | 14.8 |
| 22 | Control | None | 20 | 22.4 |
| 23 | Control | None | 50 | 35.8 |
| 24 | Phosphate | 1300 | 0 | 14.6 |
| 25 | Phosphate | 1300 | 20 | 15.7 |
| 26 | Phosphate | 600 | 50 | 29.0 |

(1) Parts of buffer (dry basis) per million parts of resin.
(2) Examples 22 and 25 use self generated scrap while Examples 23 and 26 use 20% by weight of self generated scrap and 30% by weight of commercial scrap all of which contains a triethylene glycol di(2-ethyl butyrate) plasticizer.

The data in Table II above illustrates the increase in color in polyvinyl butyral compositions which contain scrap material. A comparison of Examples 25 and 26 with Examples 22 and 23, respectively, illustrates that there is less yellow color developed in the polyvinyl butyral compositions which are buffered according to the teachings of the present invention than in the corresponding unbuffered samples.

EXAMPLES 27 to 30

The following examples illustrate the viscosity and color reduction that is obtained when extruding plasticized polyvinyl butyral resin, which has been buffered according to the present invention, into sheets. The resin used is conventional polyvinyl butyral resin which has been plasticized with 42 parts per hundred parts of resin of a triethylene glycol di(2-ethyl butyrate) plasticizer. The sheet is buffered with a thousand parts per million of a MacIlvaine's citrate/phosphate buffer system having a pH of 3. The extruded sheet is tested for viscosity retention and yellow color according to the procedures outlined above. The results of these tests are tabulated in Table III below.

TABLE III

SUMMARY OF EXAMPLES 27 to 30

| Example | | % Scrap | Resin Viscosity (cps) | % Yellow |
|---|---|---|---|---|
| 27 | Control - no buffer | None | 178 | 25.5 |
| 28 | buffered | None | 198 | 21.8 |
| 29 | Control - no buffer | 50 | 169 | 27.7 |
| 30 | buffered | 50 | 189 | 23.2 |

A review of the data in Table III above illustrates that sheet material extruded from polyvinyl butyral resin which is buffered according to the present invention has a higher sheet viscosity and less yellow color than the control samples which do not contain a buffer compound.

The data in the following Table IV illustrates the effect of the amount of buffer (pH of 3) on the viscosity change when using the plastic oxidation test. The resin and buffer system is the same as that used in Example 28 above.

TABLE IV

BUFFER CONCENTRATION VERSUS RESIN VISCOSITY

| Amount of Buffer (PPM) | Resin Viscosity (cps) |
|---|---|
| None | 87 |
| 20 | 100 |
| 100 | 121 |
| 200 | 134 |
| 300 | 142 |
| 500 | 150 |
| 600 | 152 |
| 700 | 153 |
| 800 | 155 |
| 900 | 156 |
| 1000 | 157 |
| 1300 | 160 |
| unheated control | 230 |

EXAMPLES 31 to 36

In these examples a polyvinyl butyral resin which is plasticized with 33 parts of dihexyl adipate per hundred parts of resin (phr) is subjected to the plastic oxidation test described above. Three different lots of this material from two different sources are used in these examples. The plasticized resin is buffered with one hundred parts per million (dry basis) of a MacIlvaine's citrate/phosphate buffer system having a pH of 6. The samples are then tested for percent viscosity loss according to the procedure outlined above. The results of these tests are tabulated in Table V below.

TABLE V

SUMMARY OF EXAMPLES 31 to 36

| Example | | % Viscosity Decrease |
|---|---|---|
| 31 | Control - no buffer | 63 |
| 32 | buffered | 34 |
| 33 | Control - no buffer | 43 |
| 34 | buffered | 27 |
| 35 | Control - no buffer | 60 |

TABLE V-continued

SUMMARY OF EXAMPLES 31 to 36

| Example | | % Viscosity Decrease |
|---|---|---|
| 36 | buffered | 50 |

The above data indicate that the plasticized resin which is buffered according to the present invention exhibits less of a viscosity change during the plastic oxidation test.

EXAMPLE 37

In this Example a bilayer glazing unit comprising a single sheet of glass laminated to a 30 mil (762 microns) sheet of plasticized polyvinyl butyral is tested for stability in an accelerated aging test. The polyvinyl butyral resin, which is plasticized with 42 parts of triethylene glycol di(2-ethyl butyrate), is buffered with 100 ppm of a MacIlvaine's citrate/phosphate buffer system having a pH of 5.5. A control is used wherein the polyvinyl butyral sheet contains 38 parts of plasticizer. The samples are exposed in an air oven at 150° F. (65.6° C.). At periodic intervals, samples of the polyvinyl butyral resins are analyzed for resin viscosity, plasticizer content and alkalinity titer levels.

The alkalinity titer is the number of milliliters of 0.01 normal hydrochloric acid required to neutralize 100 grams of the polyvinyl acetal resin. This is an arbitrary standard used to designate the alkalinity of the resin. The alkalinity titer is determined by dissolving 7 grams of the polyvinyl acetal resin in 250 cc. of preneutralized ethyl alcohol and titrating with 0.005 normal hydrochloric acid to the endpoint using bromphenol blue indicator and calculating from the result obtained to determine the milliliters of 0.01 normal acid required for 100 grams resin. The results of these tests are tabulated in Table VI below.

TABLE VI

SUMMARY OF TESTS ON BILAYER

| | Initial | 7 days (at 150°) | 14 days | 21 days | 28 days | 35 days |
|---|---|---|---|---|---|---|
| CONTROL | | | | | | |
| Resin Viscosity (cps) | 160 | — | 90 | 62 | 40* | — |
| Plasticizer Content (phr) | 38 | — | 30 | 23 | 18 | — |
| Titer (cc) | 16 | — | — | 16 | 1 | — |
| BUFFERED SYSTEM | | | | | | |
| Resin Viscosity (cps) | 200 | 180 | 158 | — | 142 | 148 |
| Plasticizer Content (phr) | 42 | 39 | 34 | — | 27 | 24 |
| Titer (cc) | 39 | — | 39 | — | 34 | 23 |

*partial insolubility.

The data in Table VI above illustrates the improved resin stability that is achieved when the resin is buffered in accordance with the teachings of the present invention. The viscosity of the buffered sheet is notably higher upon aging as is the amount of plasticizer and titer level as compared to the unbuffered control.

EXAMPLE 38

Example 37 is repeated here except that the polyvinyl butyral resins in the bilayers are covered on the inboard side with a polyethylene terephthalate film. The samples are exposed and evaluated as in Example 37 above. No change is observed in the plasticizer content because the polyethylene terephthalate film prevented plasticizer loss. However, changes were observed in viscosity and titer levels. The buffered resin shows a smaller degree of change than the control indicating greater resin stability.

TABLE VII

| SUMMARY OF TESTS ON BILAYER COVERED WITH PET | | | | | | | |
|---|---|---|---|---|---|---|---|
| | Initial | 7 days (at 150°) | 14 days | 21 days | 28 days | 35 days | 42 days |
| CONTROL | | | | | | | |
| Resin Viscosity (cps) | 195 | 125 | 117 | 107 | 102 | 96 | 93 |
| Titer (cc) | 60 | — | 52 | 44 | 45 | 28 | 40 |
| BUFFERED SYSTEM | | | | | | | |
| Resin Viscosity (cps) | 200 | 174 | 178 | — | 185 | 194 | 190 |
| Titer (cc) | 68 | — | 64 | — | 50 | 48 | 64 |

The data in Table VII above further illustrates that resins buffered according to the present invention exhibit improved viscosity stability.

The present invention also contemplates covering the polyvinyl acetal sheet with other plastic or resinous components such as polyvinyl chloride, polyvinyl fluoride, cellulose acetate, polyvinylidene chloride, polycarbonate, polymethyl methacrylate, cellulose acetobutyrate, cellulose tripropionate, silicon polymers, polyurethanes, etc. The plastic cover sheet which is placed over the polyvinyl acetal may optionally be coated with adhesion promoters and/or abrasion resistant layers which materials are well known to those skilled in the art.

The buffered polyvinyl acetals of the present invention may also be used as the interlayer in conventional laminated safety glass where the polyvinyl acetal sheet is sandwiched between two layers of glass. The buffered polyvinyl acetals may also be used as a covering on the inboard sheet of conventional three ply sandwich construction as is described in Belgium Pat. No. 803,902. This covering is used to obtain better impact properties and to reduce injuries which may occur when a person hits the glass.

The titer levels referred to above are usually due to salts added during the manufacture of the resin as is described in U.S. Pat. No. 2,496,480 to Lavin et al. In other instances the salts are added in order to obtain a titer within a certain range in order to obtain desired level of adhesion of the interlayer to the glass sheet. This is done so as to obtain optimum impact properties in the resulting laminated safety glass as is described in U.S. Pat. Nos. 3,249,489, 3,249,490, 3,402,099, 3,271,234, 3,271,235 and other references. The buffers of the present invention may cause a decrease or an increase in adhesion of the interlayer to the glass sheet depending on the particular buffer used. Those skilled in the art, upon reading the present specification, will be able to make any necessary adjustments in the level of titer control agents in order to obtain the desired impact strength.

The present invention also contemplates the use of conventional processing aids and additives in the resin. These include dyes, pigments, antioxidants, ultraviolet light stabilizers, etc. It is apparent from the foregoing that many changes and modifications can be made without departing from the spirit and scope of the present invention.

What is claimed is:

1. Laminated safety glass comprising at least one sheet of plasticized polyvinyl acetal resin laminated to at least one sheet of glass wherein the polyvinyl acetal contains an effective amount of a buffer, which when prepared as an aqueous solution has a pH in the range of from 3 to 7, in order to minimize changes in the viscosity of the polyvinyl acetal resin, wherein at least one component of the buffer is at least a bidentate ligand with the ability to interact with a metal to form a chelated ring structure and wherein the buffer is substantially free from hydrochloric, nitric and sulfuric acid components.

2. A laminated safety glass as in claim 1 wherein the polyvinyl acetal resin is polyvinyl butyral.

3. A laminated safety glass as in claim 2 wherein the amount of buffer used is in the range of from 50 to 1300 parts per million.

4. A laminated safety glass as in claim 3 wherein the buffer is selected from the group consisting of Clark and Lubs phosphate, citrate, phthalate and borate buffers.

5. A laminated safety glass as in claim 3 wherein the buffer is a MacIlvaine's citrate/phosphate buffer.

6. A laminated safety glass as in claim 1 wherein the polyvinyl acetal resin is laminated to only one sheet of glass.

7. A laminated safety glass as in claim 1 wherein the polyvinyl butyral is sandwiched between two sheets of glass.

8. Laminated safety glass comprising at least one sheet of plasticized polyvinyl butyral resin laminated to at least one sheet of glass wherein the polyvinyl butyral contains from 20 to 20,000 parts per million of a buffer, which when prepared as an aqueous solution has a pH in the range of from 3 to 7, in order to minimize changes in the viscosity of the polyvinyl butyral resin, wherein at least one component of the buffer is at least a bidentate ligand with the ability to interact with a metal to form a chelated ring structure and wherein the buffer is substantially free from hydrochloric, nitric and sulfuric acid components.

9. A laminated safety glass as in claim 8 wherein the amount of buffer used is in the range of from 50 to 1300 parts per million.

10. A laminated safety glass as in claim 9 wherein the buffer is selected from the group consisting of Clark and Lubs phosphate, citrate, phthalate and borate buffers.

11. A laminated safety glass as in claim 9 wherein the buffer is a MacIlvaine's citrate/phosphate buffer.

12. A laminated safety glass as in claim 8 wherein the polyvinyl butyral resin is laminated to only one sheet of glass.

13. A laminated safety glass as in claim 8 wherein the polyvinyl butyral is sandwiched between two sheets of glass.

14. Laminated safety glass comprising at least one sheet of plasticized polyvinyl butyral resin laminated to at least one sheet of glass wherein the polyvinyl butyral contains from 50 to 1300 parts per million of a buffer, which when prepared as an aqueous solution has a pH in the range of from 3 to 7, in order to minimize changes in the viscosity of the polyvinyl butyral resin, wherein at least one component of the buffer is at least a bidentate ligand with the ability to interact with a metal to form a chelated ring structure and wherein the buffer is substantially free from hydrochloric, nitric and sulfuric acid components; wherein the buffer is selected from the group consisting of Clark and Lubs phosphate, citrate, phthalate and borate buffers and MacIlvaine's citrate/phosphate buffers.

15. A laminated safety glass as in claim 14 wherein the polyvinyl butyral resin is laminated to only one sheet of glass.

16. A laminated safety glass as in claim 14 wherein the polyvinyl butyral is sandwiched between two sheets of glass.

* * * * *